United States Patent [19]

Chen et al.

[11] Patent Number: 5,147,566

[45] Date of Patent: Sep. 15, 1992

[54] HIGH SPEED SILENT CRACKING AGENT OF THE LIQUID-SOAKED TYPE AND THE PROCESS FOR MAKING SAME

[75] Inventors: Shichao Chen; Tianyin Liu; Hezhang Lai, all of Xunchang, China

[73] Assignee: Furong Mineral Bureau, Xunchang, China

[21] Appl. No.: 599,204

[22] Filed: Oct. 17, 1990

[30] Foreign Application Priority Data

Mar. 27, 1990 [CN] China .................. 90105791.6

[51] Int. Cl.⁵ ................................... C09N 3/00
[52] U.S. Cl. ....................... 252/8.551; 102/301; 102/313
[58] Field of Search .............. 252/8.551; 102/301, 102/313

[56] References Cited

U.S. PATENT DOCUMENTS 456,579  1/1986  Fujioka et al. .................. 106/787

Primary Examiner—Stephen J. Lechert, Jr.
Attorney, Agent, or Firm—Skjerven, Morrill MacPherson, Franklin & Friel

[57] ABSTRACT

A high speed silent cracking agent of the liquid-soaked type consists of a cartridge of solid cracking agent and a solution of liquid inhibitor catalyst. The cartridge of solid cracking agent contains about 50 to about 90 percent by weight of quicklime, about 1 to about 4 percent by weight of borax, about 8 to about 30 percent by weight of vermiculite, 0 to 2 percent by weight of aluminum powder, and 0 to about 14 percent by weight of sulphur based on the total weight of said solid cracking agent. The solution of liquid inhibitor catalyst contains about 0.05 to about 0.40 percent by weight of caustic soda, about 0.01 to about 0.50 percent by weight of quartz, about 0.04 to about 0.30 percent by weight of ammoniation agent and about 99.8 to about 98.8 percent by weight of water, or contains about 0.40 to about 1.80 percent by weight sodium silicate, about 0.05 to about 0.40 percent by weight of ammoniation agent and about 99.55 to about 97.8 percent by weight of water based on the total weight of said solution. The expansion pressure of the silent cracking agent is about 70 to about 130 MPa and the cracking time is about 3 to 60 minutes. It can be widely used in the fields of rock quarrying and processing, highway constructing, concrete foundation demolishing, smooth blasting in tunnels and shafts, and coal mining.

18 Claims, No Drawings

HIGH SPEED SILENT CRACKING AGENT OF THE LIQUID-SOAKED TYPE AND THE PROCESS FOR MAKING SAME

FIELD OF THE INVENTION

The present invention relates to a silent cracking agent, and particularly relates to a high speed silent cracking agent of the liquid-soaked type which consists of a cartridge of solid silent cracking agent and a solution of liquid inhibitor catalyst, and the process of making same and the applications thereof.

BACKGROUND OF THE INVENTION

Compared with the traditional explosive blasting method, the silent cracking method has the advantages of safety, no vibration, no flying rock, no noise, no dust and no smoke, etc. It has been widely used and attracted attention all over the world. In the prior art, most of the available silent cracking agents were prepared with quicklime as the main ingredient. In general, the quicklime was milled and mixed with other inorganic materials, such as anhydrous sodium sulphate, alumina cement, etc. in a certain proportion which used to inhibit the hydrate reaction of the quicklime. The mixture is mixed with water when used. Japanese patent application JP56-67059 disclosed a silent cracking agent prepared by milling the quicklime to powder and then mixed with other milled agents which inhibit the hydrate reaction of the quicklime. When used, the mixture is first mixed with water in a certain proportion to form a thick liquid, then the thick liquid is used to fill the boreholes. The defect of this silent cracking agent was inconvenience because it was in the thick liquid state. It has narrow ranges of applied temperature and fields, a high accident rate of holes bursting, low expansion pressure, long cracking time and high consumption of inhibitors. Japanese patent application JP60-80662 also disclosed a silent cracking agent prepared by mixing quicklime as the expansive ingredient with other auxiliary agents forming a product in cubic shape and then reacting with water. Said silent cracking agent had convenience but still had the defects of low expansion pressure, long cracking time and high consumption of inhibitors. Also known is a powder product silent cracking agent produced by adding ferric oxide, potassium fluoride and silicate, etc., to the quicklime, then calcining the mixture in a high temperature furnace at about 1200° to about 1500° C. and then milling. The products produced in this way still had the defects mentioned above. In addition, energy consumption was high during the manufacturing process.

Asahi Chemical Industry Co., Ltd., developed a silent cracking agent which produces an expansion pressure as high as from about 90 to about 100 MPa and having a minimum cracking time of 5 minutes. This silent cracking agent contained expensive organic materials as the expansive auxiliary agent as well as thermosensitive agents. Heating by electric current was necessary in order to decrease the cracking time and increase the expansion pressure of said silent cracking agent. So this agent was complicated in operation and high in cost.

OBJECTS OF THE PRESENT INVENTION

The first object of the present invention is to overcome the shortcomings of the prior art and provide a high speed silent cracking agent of the liquid-soaked type having higher expansion pressure, shorter cracking time, lower cost and controllable hydrate reaction time of the quicklime which is the main ingredient of said cracking agent, and also making use simple and convenient.

The second object of the present invention is to provide a process for manufacturing the high speed silent cracking of the liquid-soaked type mentioned above.

SUMMARY OF THE INVENTION

The present invention relates to a silent cracking agent, and particularly to a high speed silent cracking agent of the liquid-soaked type which consists of a cartridge of solid cracking agent and a solution of liquid inhibitor catalyst. The high speed silent cracking agent of the liquid-soaked type of the present invention consists of two parts, the cartridge of solid cracking agent and the solution of liquid inhibitor catalyst. The cartridge of solid cracking agent contains about 50 to about 90, preferably about 70 to about 90 percent by weight of quicklime, about 1 to about 4, preferably about 2 to about 3 percent by weight of borax, about 8 to about 30, preferably about 15 to about 25 percent by weight of vermiculite, 0 to about 2, preferably 0 to about 1 percent by weight of aluminum powder, and 0 to about 14, preferably 0 to about 10 percent by weight of sulphur based on the total weight of the mixture in the cartridge. The solution of liquid inhibitor catalyst contains about 0.05 to about 0.40, preferably about 0.10 to about 0.20 percent by weight of caustic soda, about 0.10 to about 0.50, preferably about 0.20 to about 0.25 percent by weight of quartz, about 0.04 to about 0.30, preferably about 0.08 to about 0.5 percent by weight of ammoniation agent, and about 99.81 to about 98.2 preferably about 99.62 to about 99.40 percent by weight of water based on the total weight of said solution, or contains about 0.40 to about 1.8 percent by weight of sodium silicate, about 0.05 to 0.40 percent by weight of ammoniation agent, and about 99.55 to about 97.8 percent by weight of water based on the total weight of said solution.

In the high speed silent cracking agent of the liquid-soaked type of the present invention, the quicklime in the cartridge of solid cracking agent contains a small amount of magnesium oxide. The granule sizes of the quicklime, borax, vermiculite and sulphur are in the range of from about 0.1 to about 5.0 mm with an average diameter in the range of from about 2 to about 3 mm. The size gradings of said granules are as follows: the granules with diameter in the range of from about 0.1 to about 1.0 mm are about 20 to about 80 percent by weight, preferably about 30 to about 40 percent by weight; the granules with diameter in the range of from about 1 to about 2.5 mm are about 15 to about 50 percent by weight, preferably about 20 to about 40 percent by weight, the granules with the diameter in the range of from about 2.6 to about 5.0 mm are about 5 to about 30 percent by weight, preferably about 15 to about 30 percent by weight based separately on the total weight of each kind of the granules. The filling density of the cartridge of the solid cracking agent is in the range of from about 1.30 to about 1.50 g/cm$^3$, preferably in the range of from about 1.40 to about 1.45 g/cm$^3$. The solid cracking agent is packed with long fibre material having a certain strength after being soaked and good water permeability. The preferable material is a filter paper of long fibre having a certain strength after being soaked and good water permeability.

The solution of the liquid inhibitor catalyst of the high speed silent cracking agent of the liquid-soaked type of the present invention is prepared by diluting a concentrated solution which contains about 10 to about 20 percent by weight of caustic soda, about 10 to about 25 percent by weight of quartz, about 8 to about 15 percent by weight of ammoniation agent and about 40 to about 60 percent by weight of water, or contains about 80 to about 90 percent by weight of sodium silicate and about 10 to 20 percent by weight of ammoniation agent with water at the weight ratio of about 0.5-2.0 to about 99.5-98.0.

The expansion pressure of the high speed silent cracking agent of the liquid-soaked type of the present invention is in the range of from about 70 to about 130 MPa, preferably in the range of from about 90 to about 125 MPa, and the cracking time is in the range of from about 3 to about 60 minutes.

According to the present invention, the process for manufacturing the high speed silent cracking agent of liquid-soaked type comprises:

a. crushing quicklime, borax, vermiculite and sulphur into granules separately with the sizes and size gradings mentioned above in conventional crushers, then mixing these crushed granules homogeneously with an aluminum powder at the weight ratio mentioned above. After being well mixed, filling said admixture into packing bags which are made of long fibre material having a certain strength after being soaked and good water permeability, preferably made of a filter paper of long fibre having a certain strength after soaked and good water permeability. The filling density is in the range of from about 1.30 to 1.50 g/cm$^3$, preferably in the range of from about 1.4 to about 1.45 g/cm$^3$;

b. putting about 10 to about 30 percent by weight of caustic soda, about 20 to 28 percent by weight of quartz and about 50 to about 70 percent by weight of water based on the total weight of the mixture into a container and then heating said mixture to about 200 to about 300° C. and maintaining that temperature of the mixture for about 30 to about 60 minutes. When the solid matter in the container has been totally dissolved, cooling the mixture and then putting an ammoniation agent in an amount of about 9 to about 16 percent by weight based on the weight of said mixture in the container into the container, or putting about 80 to about 90 percent by weight of sodium silicate and about 10 to about 20 percent by weight of ammoniation agent in a container and mixing the mixture for about 5 minutes at ambient temperature, thus obtaining a concentrated solution of liquid inhibitor catalyst;

c. mixing the concentrated solution of liquid inhibitor catalyst prepared in step b with water in the weight ratio of about 0.5-2 to about 99.5-98.0, and after mixing well, obtaining a solution of liquid inhibitor catalyst.

When the high speed silent cracking agent of the liquid-soaked type of the present invention is applied, the cartridge of the solid cracking agent is soaked in the solution of liquid inhibitor catalyst for about 6 to about 10 seconds. In the soaked cartridge of solid cracking agent, the weight ratio of water to solid matter is about 0.2 to about 0.25.

The high speed silent cracking agent of the liquid-soaked type of the present invention has the following advantages:

1. High in expansion pressure and short in cracking time. The maximum expansion pressure of the high speed silent cracking agent of the liquid-soaked type of the present invention is as high as 130 MPa, and the minimum cracking time is only 3 minutes.

2. The expansive ingredients are processed in the shape of a cartridge and the inhibitor catalyst is processed to a liquid state, therefore it is convenient and consumption of the inhibitor catalyst is reduced.

3. All the expansive ingredients are inorganic materials, and the dosage of inhibitor catalyst is small so the cost of the high speed silent cracking agent of the present invention is low.

DETAILED DESCRIPTION OF THE INVENTION

Quicklime is a cheap inorganic material. When the calcium oxide in it is combined with water, the hydrate reaction takes place and produces calcium hydroxide:

$$CaO + H_2O \rightarrow Ca(OH)_2 + 15.5 \text{ Kcal}$$

In a closed system, the calcium oxide reacts with water and produces expansion pressure. This is because, on one hand, the reaction produces hex plate-like crystals of calcium hydroxide which have a larger volume than that of calcium oxide; on the other hand, the heat produced from the reaction makes the volume of matter in the system increase. Generally speaking, in a closed system, the volume of the calcium oxide after it has reacted with water is about 2.0 to about 2.2 times as much as that of the calcium oxide before the reaction takes place.

In an open system, calcium oxide reacts rapidly when combined with water and releases a large amount of heat and gas. Therefore, pure calcium oxide cannot be used as a silent cracking agent. Appropriate inhibitors have to be put into the calcium oxide in order to inhibit the reaction rate of the calcium oxide when it is combined with water.

In the prior art, the calcium oxide and the solid inhibitors are normally milled to powder in ball mills and mixed to prepare silent cracking agent. When it is used, the powder mixture is mixed with water. In the prior art, in order to inhibit the hydrate reaction of the quicklime efficiently, a large amount of inhibitors is used. But the increase of the dosage of the inhibitors reduces the expansion pressure of the silent cracking agent.

The high speed silent cracking agent of the liquid-soaked type of the present invention consists of two parts, the solid cracking agent and the solution of liquid inhibitor catalyst. The solid cracking agent is processed in the shape of cartridge which contains about 50 to about 90, preferably about 70 to about 90 percent by weight of quicklime (calcium oxide); about 1 to about 4, preferably about 2 to about 3 percent by weight of borax; about 8 to about 30, preferably about 20 to about 25 percent by weight of vermiculite; 0 to about 2, preferably 0 to about 1 percent by weight of aluminum powder; and 0 to about 14, preferably 0 to about 10 percent by weight of sulphur based on the total weight of the mixture in said cartridge. The solution of the liquid inhibitor catalyst contains about 0.05 to about 0.40, preferably about 0.10 to about 0.20 percent by weight of caustic soda; about 0.10 to about 0.50, preferably about 0.20 to about 0.30 percent by weight of quartz; about 0.04 to about 0.30, preferably about 0.08 to about 0.15 percent by weight of ammoniation agent;

and about 99.8 to about 98.5, preferably about 99.2 to about 99.6 percent by weight of water; or contains about 0.40 to about 1.80 percent by weight of calcium silicate; about 0.05 to about 0.40 percent by weight of ammoniation agent; and about 99.55 to about 97.8 percent by weight of water based on the total weight of said solution.

In the high speed silent cracking agent of the liquid-soaked type of the present invention, the cartridge of solid cracking agent contains calcium oxide as the main ingredient, and borax, vermiculite, etc. In addition, aluminum powder and sulphur may also be added to said cartridge. When the cartridge of solid cracking agent which contains the ingredients mentioned above is combined with water, the calcium oxide in the cartridge engages in an exothermic reaction which makes the temperature of the system increase. Generally, the temperature may rise as high as about 200° to about 300° C. On one hand, the volume of the reaction products (calcium hydroxide) is larger than that of the reactant (calcium oxide); on the other hand, the existence of other thermal expansive materials in the cartridge, such as borax, vermiculite, aluminum powder, sulphur, etc., will result in the further increase of the volume of the mixture after reaction. After the hydrate reaction of quicklime has taken place, the volume of the mixture in the cartridge may increase to about 3 to about 4 times as much as that of the unreacted mixture in the cartridge. The expansion pressure is in the range of from about 70 to about 130 MPa, and the cracking time is in the range of from about 3 to about 60 minutes.

In the high speed silent cracking agent of the liquid-soaked type of the present invention, the solution of liquid inhibitor catalyst is made from diluting a concentrated solution of inhibitor catalyst which contains about 10 to about 20 percent by weight of caustic soda, about 20 to about 25 percent by weight of quartz, about 8 to about 15 percent by weight of ammoniation agent, and about 50 to about 60 percent by weight of water based on the total weight of the concentrated solution, or contains about 80 to 90 percent by weight of calcium silicate and about 10 to 20 percent ammoniation agent based on the total weight of the concentrated solution with water at the weight ratio of from about 0.5-2 to about 99.5-98.0.

In the high speed silent cracking agent of the liquid-soaked type of the present invention, the solution of liquid inhibitor catalyst contains caustic soda which contains small amounts of $Na_2SO_4$, quartz and ammoniation agent. The caustic soda and quartz act mainly as catalysts for catalyzing the hydrate reaction of the calcium oxide and enlarging the crystal of the calcium hydroxide, and the ammoniation agent acts as an inhibitor for inhibiting and controlling the hydrate reaction rate of calcium oxide during the hydrate reaction of the solid cracking agent.

The features of the high speed silent cracking agent of the present invention are that the solid cracking agent is processed in the shape of cartridge which contains the main ingredient of calcium oxide as well as other auxiliary expansive ingredients, such as borax, vermiculite, etc., and if necessary, aluminum powder and/or sulphur for increasing the expansion pressure of the silent cracking agent; the inhibitors, which inhibit and control the hydrate rate of the calcium oxide, such as ammoniation agent, and the catalysts, which catalyze the hydration of the calcium oxide as well as increase the crystal of calcium hydroxide, such as caustic soda, quartz and calcium silicate, etc., which are processed into liquid form. The ammoniation agent is an anionic surfactant. Suitable cationic or non-ionic surfactant may also be used.

When the high speed silent cracking agent of the liquid-soaked type of the present invention is used, the cartridge of solid cracking agent is soaked in the solution of liquid inhibitor catalyst. The packing bags of the cartridge of solid cracking agent are made of long fibre material having a certain strength after being soaked and good water permeability, preferably made of a filter paper of long fibre having a certain strength after being soaked and good water permeability. When the cartridge of solid cracking agent has been soaked, the liquid inhibitor catalyst permeates through the packing bag to the granule surface of the solid cracking agent in the bag and forms an absorbed film of inhibitor. This slows down the process of the water molecules in the liquid inhibitor catalyst moving to the granule surface. After the hydrate reaction has taken place, the large granules of the calcium oxide expand and break, and the surface-absorbed film on the surface of the large granules of calcium oxide is destroyed. But new absorbed films of the liquid inhibitor catalyst can be formed on the broken granule surface which will inhibit the hydrate reaction of calcium oxide further. In the present invention, the inhibitor catalyst acts efficiently and its dosage is low. Therefore, the silent cracking agent according to the present invention avoids the decrease of expansion pressure due to the excessive use of inhibitors.

In the high speed silent cracking agent of the liquid-soaked type of the present invention, the inhibitor catalyst is in the liquid state. Only when it is used does the solid cracking agent contact the inhibitor catalyst. Therefore, under the condition of a small amount of inhibitors being consumed, not only does this slow the hydrate reaction of calcium oxide, but also increases the expansion pressure and decreases the cracking time of the solid silent cracking agent.

It is commonly believed that the expansion of volume of the solid material has a close relation with the size and size gradings of the material. In the prior art, the silent cracking agent is a powder mixture consisting of calcium oxide, auxiliary expansive ingredients, solid inhibitors and catalysts. In the mixture a large amount of inhibitors and catalysts are used which decrease the amount of expansive ingredient used relatively, and decrease its expansion pressure.

The expansion pressure of a silent cracking agent is related to the following factors:

a. the density of the calcium oxide (quicklime) before the hydrate reaction;

b. the composition of the silent cracking agent; and c. the granule sizes and the size gradings of the silent cracking agent.

In the prior art, most of the silent cracking agents are powder products and much water is consumed in use. When mixed with water, a flocculating material is produced in the silent cracking agent, which binds up much of the water to increase the porosity of the calcium oxide and decrease the density of the quicklime. On the other hand, because of the silent cracking agent being in the powdered form, the expansion of the volume after hydrate reaction is less. All of these reduce the expansion pressure.

In the high speed silent cracking agent of the liquid-soaked type of the present invention, the quicklime (calcium oxide), borax, vermiculite and sulphur in the cartridge of solid cracking agent are granules with the sizes in the range of from about 0.1 to about 5.0 mm with an average diameter of about 2 to about 3 mm. The inhibitor is ammoniation agent which is an anionic surfactant. Before the hydrate reaction of the calcium oxide takes place, an absorbed film of liquid inhibitor catalyst has been formed in the granule surface of the solid cracking agent. Said absorbed film can avoid the formation of flocculating material in the cartridge of solid cracking agent, and the amount of water consumed is small. Therefore, the density of the cracking agent is not reduced before the hydrate reaction takes place. Moreover, the liquid inhibitor catalyst forms a further absorbed layer on the surface of the hydrated solid cracking agent and increases the electric potential of the diffused double-layer and the repelling forces between the granules. Furthermore, due to the thickening of the dissolved layer on the granule surfaces, the distances between the granules increase so that the volume expansion after the hydrate reaction is increased. The existence of the absorbed layer in the granule surfaces reduces the free energy of the solid-liquid boundary so the water can reach the wetted surface easily and the granules can disperse freely. In addition, the surfactant can form boundary films with a certain mechanical strength on the granule surface which can prevent the coagulations of the granules and increase the expansion of volume of the reacted cartridge of solid cracking agent.

In the cartridge of solid cracking agent of the present invention, the size gradings of granules, with the size in the range of from about 0.10 to 5.0 mm, influence the expansion pressure of the cartridge after it is hydrated.

In a preferred embodiment of the present invention, the cartridge of solid cracking agent contains 75 percent by weight of quicklime (calcium oxide), 2 percent by weight of borax, 1.5 percent by weight of vermiculite, 1 percent by weight of aluminum powder and 7 percent by weight of sulphur based on the total weight of the mixture in said cartridge. The compositions of the liquid inhibitor catalyst and the cartridge of solid cracking agent are kept in constant. The effect of changes in the size gradings of the granules of the solid cracking agent on the expansion pressure are shown in Table 1.

It can be seen from Table 1 that when the granule size grading is such that the granules in the range of from about 0.1 to about 1.0 mm are about 50 percent by weight, the granules with the size in the range of from about 1.1 to about 2.5 mm are 35 percent and the granules with the size in the range of from about 2.6 to about 5.0 mm are 25 percent by weight based on the total weight of each kind of granules, the expansion pressure has the maximum value of 122 MPa.

In the high speed silent cracking agent of the liquid-soaked type according to the present invention, the granule size gradings of the solid cracking agent in the cartridge are as follows: the granules with the size in the range of from about 0.1 to about 1.0 mm are about 20 to about 80, preferably about 30 to about 60 percent by weight, the granules with the size in the range of from about 1.1 about 2.5 mm are about 15 to about 50, preferably about 25 to about 40 percent by weight, and the granules with the size in the range of from about 2.6 to about 5.0 mm are about 5 to about 30, preferably about 15 to about 30 percent by weight based on the total weight of each kind of granules.

In the high speed silent cracking agent of the liquid-soaked type of the present invention, a small amount of magnesium oxide is contained in the said calcium oxide and a small amount of sodium sulphate is contained in the caustic soda and sodium silicate. In the solution of liquid inhibitor catalyst, the ammoniation agent is an anionic surfactant. Other suitable cationic or non-ionic surfactants may also be used.

The solid cracking agent of the present invention is processed in the shape of a cartridge, and therefore it is applicable to all kinds of boreholes, despite the boreholes being upward or downward inclined.

The process for manufacturing the high speed silent cracking agent of the present invention comprises:

a. crushing quicklime (calcium oxide), borax, vermiculite and sulphur separately in conventional crushers to granules of the size in the range of from about 0.1 to about 5.0 mm, then mixing the crushed granules with aluminum powder according to the following ratio: about 50 to about 90, preferably about 70 to about 90 percent by weight of quicklime; about 1 to about 4, preferably about 2 to about 3 percent by weight of borax; about 8 to about 30, preferably about 15 to about 25 percent by weight of vermiculite; 0 to about 2, preferably 0 to about 1 percent by weight of aluminum powder and 0 to about 14, preferably 0 to about 10 percent by weight of sulphur based on the total weight of the mixture in the cartridge; filling the mixture which has been well mixed into packing bags and sealing said packing bags, thus obtaining the cartridge of the solid cracking agent;

b. putting about 10 to about 23 percent by weight of caustic soda, about 20 to about 28 percent by weight of quartz and about 50 to about 70 percent by weight of water into a container, after being mixed, heating the mixture to about 200° to about 300° C. and keeping the mixture at said temperature for about 30 to about 60 minutes. When the solid material in the container has been totally dissolved, cooling said mixture and then adding about 9 to about 16 percent by weight of ammoniation agent, based on the total weight of said mixture in the container, into the container or putting about 80 to about 90 percent by weight of calcium silicate and about 10 to about 20 percent by weight of ammoniation agent based on the total weight of the mixture into a container and mixing for about 5 minutes at ambient temperature, thus obtaining a concentrated solution of liquid inhibitor catalyst;

c. mixing the concentrated solution of liquid inhibitor catalyst prepared in step b with water in the weight ratio of about 0.5-2 to about 99.5-98.0 after being mixed homogeneously, the solution of liquid inhibitor catalyst being obtained.

In the process according to the present invention, the granule sizes of the calcium oxide, borax, vermiculite, and sulphur are in the range of from about 0.1 to about 5.0 mm and the average size is about 2 to about 3 mm. The granule size gradings of these granules are as follows: the granules with the size in the range of from about 0.1 to about 1.0 mm are about 20 to about 80 percent by weight, the granules with the size in the range of from about 1.1 to about 2.5 mm are about 5 to about 30 percent by weight, the granules with the size in the range of from about 2.6 to about 5.0 mm are about 5 to about 30 percent by weight based separately on the total weight of each kind of the granules. The preferable size gradings of these granules are as follows: the granules with the size in range of about 0.1 to about 1.0 mm are about 30 to about 40 percent by weight, the granules with the size in the range of from about 1.1 to about 2.5 mm are about 25 to about 40 percent by weight, and the granules with the size in the range of from about 2.6 to about 5.0 mm are about 15 to about 30 percent by weight based on the total weight of each kind of the granules. The packing bags of the cartridges of solid cracking agent are made of long fibre material having a certain strength after being soaked and good water permeability, preferably made of a filter paper of long fibre having a certain strength after being soaked and good water permeability. The filling density is in the range of from about 1.30 to about 1.50 g/cm, preferably from about 1.4 to about 1.45 g/cm³. The calcium oxide contains a small amount of magnesium oxide. The caustic soda and the calcium silicate contain a small amount of sodium sulphate.

Use of the high speed silent cracking agent of the liquid-soaked type of the present invention comprises: first putting the cartridge of the solid cracking agent mentioned above into the solution of liquid inhibitor catalyst and soaking for about 6 to about 10 seconds, the ratio of water to solid matter in the soaked cartridge of solid cracking agent being from about 0.20 to about 0.25, then putting the soaked cartridges of solid cracking agent into the boreholes separately and filling the boreholes firmly. The object to be broken will be broken in about 3 to about 60 minutes. The expansion pressure of the silent cracking agent of the present invention is from about 70 to about 130 MPa. The diameter of the cartridge of solid cracking agent is a little smaller than that of the boreholes.

In a preferable embodiment of the present invention, the cartridge of solid cracking agent contains 80 percent by weight of quicklime, 4 percent by weight of borax and 16 percent by weight of vermiculite based on the total weight of the mixture in the cartridge; the solution of inhibitor catalyst contains 0.15 percent by weight of caustic soda, 0.20 percent by weight of ammoniation agent and 99.7 percent by weight of water based on the total weight of the solution. The expansion pressure is 95 to 100 MPa, and the cracking time is 5 minutes.

The high speed silent cracking agent of the liquid-soaked type of the present invention can be used in various fields, such as rock quarrying and processing, highway constructing, concrete foundation demolishing, smooth blasting in tunnels and shafts and coal mining, etc.

The utility of the above-described invention is further illustrated by the following examples. These examples are representative only and not limiting.

EXAMPLE 1

Quicklime, borax, vermiculite and sulphur are crushed in conventional crushers separately to granules with the sizes in the range of 0.1 to 5 mm. The size gradings are as follows: the granules with the size in the range of from 0.1 to 1.0 mm are about 50 percent by weight, the granules with the size in the range of from 1.1 to 2.5 mm are about 35 percent by weight, and the granules with the size in the range of from 2.6 to 5.0 mm are 25 percent by weight based on the total weight of each kind of the granules. The crushed quicklime, borax, vermiculite, sulphur and aluminum powder are well mixed according to the weight ratio of 70 percent of quicklime, 3 percent of borax, 1 percent of aluminum powder and 8 percent by weight of sulphur. Then the material is filled into packing bags which are made of filter paper of long fibre having a certain strength after being soaked and good water permeability. The dimension of the packing bags are 37×280 mm, a little smaller in diameter than that of the boreholes. After the package is sealed, the cartridge of solid cracking agent is obtained.

Put 15 percent by weight of caustic soda, 25 percent by weight of quartz and 65 percent by weight of water into a container, then heat the mixture to 250° C. and maintain the temperature for 45 minutes. When the solid matter in the container has been dissolved completely, cool the mixture and put 10 percent by weight of a commercial ammoniation agent, based on the total weight of the prepared mixture, into the mixture and obtain a concentrated solution of inhibitor and catalyst. Mix the concentrated solution with water in the weight ratio of 0.5 to 99.5 and stir the mixture homogeneously. In this way, the solution of liquid inhibitor catalyst is prepared.

The expansion pressure of the high speed silent cracking agent of the liquid-soaked type obtained is 100 MPa and the cracking time is 3 minutes.

EXAMPLES 2 to 8

The same processes as used in Example 1 are used to prepare the high speed silent cracking agent of the liquid-soaked type of Example 2 to Example 8. In all the silent cracking agents of these examples, all of the granule sizes and the size gradings of the granules in the cartridge are the same as in Example 1 but the compositions differ. The solution of inhibitor catalyst is made by diluting the concentrated solution prepared in Example 1 with water in different weight ratios. The various compositions and the characteristics of the high speed silent cracking agent of the liquid-soaked type are shown in Table 2.

It can be seen from Table 2 that the higher the concentration of the solution of liquid inhibitor catalyst is, the longer the cracking time will be. Examples of application and comparison 1. Test on the ground Breaking tests have been made on the different types of rock, concrete and surrounding rock with the silent cracking agent prepared in Example 7 and with a commercial silent cracking agent called Bristar (from Onoda Cement Co. of Japan). The intervals between the boreholes and the break effects are shown in Table 3.

Table 3 shows that the high speed silent cracking agent of the liquid-soaked type of the present invention can be applied in the condition of large intervals between boreholes and higher grades of rock in hardness. Its cracking time is shorter than that of commercial product.

2. Underground Tests

A. Smooth blasting tests underground

Tests have been carried out in three types of lanes: coal lanes, coal-measure rock lanes, and rock lanes, by applying the silent cracking agent of the present invention. The intervals between boreholes are given in Table 4.

Table 4 shows that the silent cracking agent of the present invention can be used for cracking the rocks with hardness of being in the range of from about 6 to about 8, the intervals between boreholes and the burdens can be more than 400 mm, which has reached and exceeded the standard of the intervals between boreholes in smooth blasting. So compared with smooth blasting, there is no necessity to drill more holes.

B. Coal breaking tests at a coal mining face

The tests were carried out at several coal mines in Le Shan (Sichuan Province, China) with cutting-coal cutters. In normal conditions, the depth of cutting is about 1 meter and the intervals between boreholes in the range of about 500 to about 1000 mm. After the break, the rate of coal is over 80 percent by weight. The props are not pushed down and the face conveyer is not turned over during coal mining During coal cracking, a parallel operating pattern can be applied, i.e., cutting, drilling and coal falling can be carried out at the same time. Therefore, the method saves working time, improves working efficiency and avoids miners breathing blasting smoke.

It is understood that certain modifications, within the scope of these teachings, will be apparent to those skilled in the art

TABLE 1*

The effects of the size gradings on expansion pressure

| Size Gradings (wt. %) | | | Expansion Pressure MPa |
|---|---|---|---|
| Granule Size 0.1 to 1 mm | Granule Size 1.1 to 2.5 mm | Granule Size 2.6 to 5 mm | |
| 80 | 15 | 5 | 80.3 |
| 60 | 25 | 15 | 102 |
| 40 | 35 | 25 | 122 |
| 30 | 40 | 30 | 110.5 |
| 20 | 50 | 30 | 81.5 |

*1. The tests are accomplished in the laboratory at ambient temperature of 35° C.
2. The highest temperature of the silent cracking agent is as high as 255° C.
3. The ratio of water to solid matter in the soaked cartridge is 0.2.

TABLE 2

The compositions and characteristics of the silent cracking agent of the present invention

| | Silent Cracking Agent | | | | | | | |
|---|---|---|---|---|---|---|---|---|
| | Composition of the Cartridge (wt. %) | | | | | Weight Ratio of the | Expansion | |
| Example No. | Quick Lime | Borax | Vermi-culite | Aluminium Powder | Sulphur | Concentrated Solution to Water* | Pressure (MPa) | Cracking Time (Min) |
| 2 | 70 | 2 | 15 | 1 | 12 | 0.5:99.5 | 128 | 3 |
| 3 | 80 | 1 | 10 | 0 | 9 | 0.8:99.2 | 100 | 10 |
| 4 | 60 | 4 | 21 | 2 | 13 | 1.0:99.0 | 90 | 25 |
| 5 | 50 | 4 | 30 | 2 | 14 | 1.2:98.8 | 70 | 35 |
| 6 | 90 | 1 | 8 | 1 | 0 | 1.0:99.0 | 90 | 30 |
| 7 | 75 | 2 | 15 | 1 | 7 | 1.5:98.5 | 122 | 45 |
| 8 | 80 | 4 | 16 | 0 | 0 | 2.0:98.0 | 95 | 60 |

*The compositions and methods for preparing the concentrate solution are shown in Example 1.

TABLE 3

Comparisons of the break effects of the silent cracking agent of the present invention with that of Bristar (Onoda Cement Co. of Japan)

| Object to be Broken | Rock Type | Interval between Boreholes (mm) | | Cracking time (min) | |
|---|---|---|---|---|---|
| | | A[1] | B[2] | A | B |
| Isolated Lump | Soft | 700-1000 | 500-600 | 5 | 180 |

TABLE 3-continued

Comparisons of the break effects of the silent cracking agent of the present invention with that of Bristar (Onoda Cement Co. of Japan)

| Object to be Broken | Rock Type | Interval between Boreholes (mm) | | Cracking time (min) | |
|---|---|---|---|---|---|
| | | A[1] | B[2] | A | B |
| Rock | middle hard | 600-700 | 400-500 | 10 | 250 |
| | hard | 400-500 | 200-300 | 20 | 400 |
| Concrete | no steel | 600-900 | 400-500 | 3 | 120 |
| | with steel | 400-500 | 300-400 | 10 | 200 |
| | much steel | 300-380 | 200-300 | 20 | 300 |
| Surrounding | Soft | 600-800 | 300-400 | 10 | 200 |
| Rock (with 3 | middle hard | 450-650 | 200-400 | 15 | 400 |
| free rock) | hard | 300-600 | 100-200 | 25 | 600 |

1. A stands for the high speed silent cracking agent of liquid-soaked type of the present invention prepared in Example 7.
2. B estands for the commercial silent cracking agent Bristar.

TABLE 4

The intervals between boreholes of different rocks cracked by the silent cracking agent of the present invention

| | Intervals between boreholes mm | | | | |
|---|---|---|---|---|---|
| | f* | | | | |
| Name of lane | 4 | 6 | 8 | 10 | 12 |
| Coal lane | 500 × 500 | 450 × 450 | 400 × 400 | | |
| Coal-measure Rock lane | 450 × 450 | 400 × 400 | 350 × 350 | 300 × 300 | |
| Rock lane | 450 × 450 | 400 × 400 | 380 × 380 | 300 × 300 | 250 × 250 |

*f stands for the hardness of rock
Note: The silent cracking agent used in these tests is the one prepared in Example 7.

We claim:

1. A high speed silent cracking agent of the liquid-soaked type comprising a cartridge of solid cracking agent and a solution of liquid inhibitor catalyst, wherein said cartridge of solid cracking agent contains about 50 to about 90 percent by weight of quicklime, about 1 to about 4 percent by weight of borax, about 8 to about 30 percent by weight of vermiculite 0 to about 2 percent by weight of aluminum powder and 0 to about 14 percent by weight of sulphur of the total weight of the mixture in the cartridge; said solution of liquid inhibitor catalyst contains about 0.05 to about 0.040 percent by weight of caustic soda, about 0.10 to about 0.50 percent by weight of quartz, about 0.04 to about 0.30 percent by weight of ammoniation agent, and about 99.8 to about 98.0 percent by weight of water of the total weight of said solution.

2. The high speed silent cracking agent of the liquid-soaked type of claim 1, wherein said quicklime in the cartridge of solid cracking agent contains a small amount of magnesium oxide.

3. The high speed silent cracking agent of the liquid-soaked type of claim 1, wherein granule diameters of quicklime, borax, vermiculite and sulphur in the cartridge of solid cracking agent are in the range of from about 0.1 to about 5.0 mm and average granule diameters are about 2 to about 3 mm.

4. The high speed silent cracking agent of the liquid-soaked type of claim 3, wherein granules having diameters in the range of from about 0.1 to about 1.0 mm are about 20 to about 80 percent by weight of the cracking agent, granules having diameters in the range of from about 1.1 to about 2.5 mm are about 15 to about 45 percent by weight, and granules having diameters in the range of from about 2.6 to about 5.0 mm are about 15 to about 30 percent by weight of the total weight of each kind of the granules.

5. The high speed silent cracking agent of the liquid-soaked type of claim 4, wherein granules having diameters in the range of from about 0.1 to about 1.0 mm are about 30 to about 40 percent by weight of the cracking agent, granules having diameters in the range of from about 1.1 to about 2.5 mm are about 25 to about 40 percent by weight, and granules having diameters in the range of from about 2.6 to 5.0 mm are about 15 to about 30 percent by weight, wherein all the percentages are of the total weight of each kind of the granules.

6. The high speed silent cracking agent of the liquid-soaked type of claim 1, wherein a packing bag for the cartridge of solid cracking agent is of long fibre material having a certain strength after being soaked and good water permeability.

7. The high speed silent cracking agent of the liquid-soaked type of claim 6, wherein said long fibre material is a filter paper having a long fibre.

8. The high speed silent cracking agent of the liquid-soaked type of claim 1, wherein a filling density of the cartridge of the solid cracking agent is in the range of from about 1.30 to about 1.50 g/cm$^3$.

9. The high speed silent cracking agent of the liquid-soaked type of claim 89, wherein said filling density of the cartridge of solid cracking agent is in the range of from about 1.40 to about 1.45 g/cm$^3$.

10. The high speed silent cracking agent of the liquid-soaked type of claim 1, wherein the solution of liquid inhibitor catalyst is prepared by diluting a concentrated solution of inhibitor catalyst, which contains about 10 to about 20 percent by weight of caustic soda, about 20 to about 25 percent by weight of quartz, about 8 to about 15 percent by weight of ammoniation agent, and about 40 to about 60 percent by weight of water.

11. The high speed silent cracking agent of the liquid-soaked type of claim 1, wherein the caustic soda and the calcium silicate contain a small amount of sodium sulphate.

12. The high speed silent cracking agent of the liquid-soaked type of claim 1, wherein the volume of the cartridge of solid cracking agent after being reacted with the liquid inhibitor catalyst is about 3 to about 4 times as much as that of an unreacted cartridge of solid cracking agent.

13. The high speed silent cracking agent of the liquid-soaked type of claim 1, wherein an expansion pressure of the silent cracking agent is from about 70 to about 130 MPa.

14. The high speed silent cracking agent of the liquid-soaked type of claim 1, wherein a cracking time of said silent cracking agent is in the range of about 3 to about 60 minutes.

15. The high speed silent cracking agent of the liquid-soaked type of claim 1, wherein said cartridge contains about 70 to about 90 percent by weight of quicklime, about 2 to about 3 percent by weight of borax, about 10 to about 25 percent by weight of vermiculite, 0 to about 1 percent by weight of aluminum powder and 0 to about 10 percent by weight of sulphur.

16. The high speed silent cracking agent of the liquid-soaked type of claim 1, wherein said solution of liquid inhibitor catalyst contains about 0.10 to about 0.20 percent by weight of caustic soda, about 0.20 to about 0.30 percent by weight of quartz, and about 0.08 to about 0.15 percent by weight of ammoniation agent.

17. A high speed silent cracking agent of the liquid-soaked type comprising:
a cartridge of solid cracking agent and a solution of liquid inhibitor catalyst, wherein said cartridge of silent cracking agent contains about 50 to about 90 percent by weight of quicklime, about 1 to about 4 percent by weight of borax, about 8 to about 30 percent by weight of vermiculite, 0 to about 2 percent by weight of aluminum powder and 0 to about 14 percent by weight of sulphur of the total weight of the mixture in the cartridge;
said solution of liquid inhibitor catalyst contains about 0.40 to about 1.8 percent by weight of calcium silicate, about 0.05 to about 0.40 percent by weight of ammoniation agent and about 99.55 to about 97.8 percent by weight of water of the total weight of said solution.

18. The high speed silent cracking agent of the liquid-soaked type of claim 1, wherein the solution of liquid inhibitor catalyst is prepared by diluting a concentrated solution of inhibitor catalyst, which contains about 80 to about 90 percent by weight of calcium silicate and about 10 to about 20 percent by weight of ammoniation agent of the total weight of said concentrated solution, with water in the weight ratio being from about 0.5-2 to about 99.5-98.0.

* * * * *